May 23, 1933. W. A. SCHOLLMEYER 1,910,503
NONGLARE MIRROR SHIELD
Filed Oct. 6, 1931
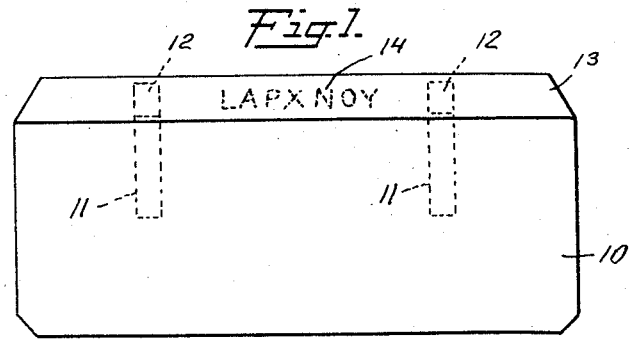
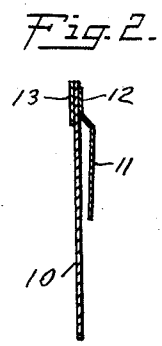
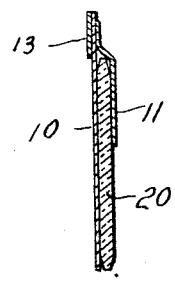
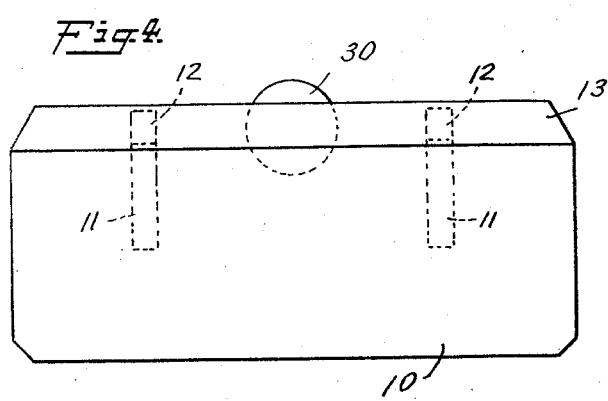
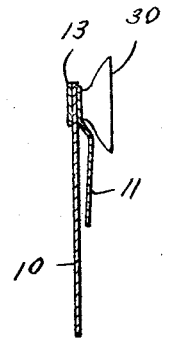
INVENTOR
William A. Schollmeyer
BY
Marshall & Hawley
ATTORNEYS

UNITED STATES PATENT OFFICE

WILLIAM A. SCHOLLMEYER, OF YONKERS, NEW YORK

NONGLARE MIRROR SHIELD

Application filed October 6, 1931. Serial No. 567,195.

This invention relates to improvements in non-glare mirror shields and its object is to provide a simple and inexpensive device which may be readily attached to the rear view mirror of an automobile for the purpose of absorbing rays of light, especially the glare of head lights from other automobiles at the rear at night. This results in relieving eye strain and removing the dazzling effect of the bright lights which often cause disaster. Another object is to make the device of neat attractive appearance and of a form which readily adapts it for advertising purposes.

These and other objects will appear from the following specifications in which I will describe the invention, the specific features of which will be pointed out in appended claim.

Referring to the drawing,

Fig. 1 is an elevation of a device which is made according to and embodies the present invention.

Fig. 2 is a sectional side elevation of the device shown in Fig. 1.

Fig. 3 is a sectional side elevation of the device shown in the preceding figures applied to the rear view mirror.

Fig. 4 is an elevation of a modified form of device and

Fig. 5 is a sectional side elevation of the structure shown in Fig. 4.

10 designates a shield formed of a sheet of colored translucent material such as celluloid of substantially the size and shape of the mirror to which it is to be attached. Spaced clips 11, 11 of the same material as the shield, have portions 12, 12 cemented to the rear surface of the shield near its upper edge. 13 is a strip of opaque material cemented to the front face of the shield along its upper edge and over the portions 12 of the clips. This is preferably of the same material as that of the shield and the clips. Its outer surface is adapted to carrying advertising matter where the letters 14 appear on the drawing,—Fig. 1.

This device is adapted to be placed upon the mirror 20 in the manner shown in Fig. 3. In this position some of the light rays reflected by the mirror are absorbed and softened. The clips 11 are then out of sight and the cemented portions 12 thereof, which would otherwise be unsightly, are covered by the strip 13. The latter is of itself made of ornamental appearance as by being made of a color which contrasts but harmonizes with the color of the shield 10, and by being marbled or mottled or otherwise made decorative. Obviously it makes an ornamental finished edge. When advertising matter is on the strip 13 it is immediately before the eyes of the driver without being objectionally conspicuous.

When clear vision is desired, the device may be removed from the mirror as easily as it is applied.

By providing a suction cup 30 to the upper central part of the device, on one or the other side thereof as shown in Figs. 4 and 5, the device may be applied to the windshield of the car when it is not in use on the mirror. This increases the usefulness as in this position it may be used to soften the glare of headlights on approaching cars.

I intend no limitations other than those imposed by the following claim:

What I claim is:

A non-glare shield comprising a flat sheet of translucent material, a pair of spaced clips having portions thereof affixed to the rear surface of said sheet near its upper edge, and a strip of opaque material affixed to the front surface of the sheet and covering the affixed portions of the clips.

WILLIAM A. SCHOLLMEYER.